(12) United States Patent
Kim et al.

(10) Patent No.: US 12,153,239 B2
(45) Date of Patent: Nov. 26, 2024

(54) POLARIZING PLATE, AND DISPLAY DEVICE

(71) Applicant: LG CHEM, LTD., Seoul (KR)

(72) Inventors: Min Soo Kim, Daejeon (KR); Jaehoon Shim, Daejeon (KR); Jung Hyun Seo, Daejeon (KR); Jae Pil Koo, Daejeon (KR); Joo Jong Moon, Daejeon (KR); Jaeyoung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 941 days.

(21) Appl. No.: 15/734,379

(22) PCT Filed: Jan. 10, 2020

(86) PCT No.: PCT/KR2020/000509
§ 371 (c)(1),
(2) Date: Dec. 2, 2020

(87) PCT Pub. No.: WO2020/149583
PCT Pub. Date: Jul. 23, 2020

(65) Prior Publication Data
US 2021/0173133 A1    Jun. 10, 2021

(30) Foreign Application Priority Data
Jan. 14, 2019    (KR) .................. 10-2019-0004838

(51) Int. Cl.
*G02B 5/30*    (2006.01)
*G02B 1/04*    (2006.01)
(Continued)

(52) U.S. Cl.
CPC ............. *G02B 5/305* (2013.01); *G02B 1/04* (2013.01); *G02B 1/113* (2013.01); *G02F 1/133528* (2013.01)

(58) Field of Classification Search
None
See application file for complete search history.

(56) References Cited

U.S. PATENT DOCUMENTS 7,524,553 B2    4/2009    Yoneyama et al.
8,591,046 B2   11/2013    Hamamoto et al.
(Continued)

FOREIGN PATENT DOCUMENTS

CN    104246540 A    12/2014
JP    2008-001755 A    1/2008
(Continued)

OTHER PUBLICATIONS

International Search Report issued for International Application No. PCT/KR2020/000509 on May 25, 2020, 6 pages.
(Continued)

*Primary Examiner* — Anthony J Frost
(74) *Attorney, Agent, or Firm* — ROTHWELL, FIGG, ERNST & MANBECK, P.C.

(57) ABSTRACT

The present disclosure provides a polarizing plate comprising: a polarizer; an optical laminate formed on one side of the polarizer and containing a polymer substrate and an antiglare layer; and a thermoplastic resin layer formed on the other side of the polarizer and containing a (meth)acrylate resin, and a liquid crystal panel and a display device including the polarizing plate.

18 Claims, 3 Drawing Sheets

(51) Int. Cl.
 *G02B 1/113* (2015.01)
 *G02F 1/1335* (2006.01)

(56) References Cited

U.S. PATENT DOCUMENTS

| | | | |
|---|---|---|---|
| 9,410,023 | B2 | 8/2016 | Shiraishi et al. |
| 9,650,481 | B2 | 5/2017 | Shiraishi et al. |
| 9,696,463 | B2 | 7/2017 | Honda et al. |
| 2011/0159278 | A1 | 6/2011 | Lee et al. |
| 2013/0250414 | A1 | 9/2013 | Eguchi et al. |
| 2014/0126064 | A1* | 5/2014 | Kishi ................ G02F 1/133502 359/601 |
| 2014/0211316 | A1 | 7/2014 | Furui et al. |
| 2014/0247495 | A1 | 9/2014 | Honda et al. |
| 2015/0116835 | A1* | 4/2015 | Ogumi ................ G02B 5/0221 359/601 |
| 2015/0183945 | A1* | 7/2015 | Shiraishi ................ B32B 7/12 525/224 |
| 2015/0212368 | A1 | 7/2015 | Yonemoto et al. |
| 2015/0355386 | A1 | 12/2015 | Horii et al. |
| 2016/0146978 | A1 | 5/2016 | Lee et al. |
| 2016/0349413 | A1* | 12/2016 | Nakata ................ G02B 5/3083 |
| 2018/0037755 | A1 | 2/2018 | Shimosugi |
| 2018/0348408 | A1 | 12/2018 | Serizawa et al. |
| 2018/0364400 | A1 | 12/2018 | Eguchi et al. |

FOREIGN PATENT DOCUMENTS

| | | |
|---|---|---|
| JP | 2009-210592 A | 9/2009 |
| JP | 2012-018383 A | 1/2012 |
| JP | 2014-063050 A | 4/2014 |
| JP | 2015-120253 A | 7/2015 |
| JP | 2015-206837 A | 11/2015 |
| JP | 2017-138620 A | 8/2017 |
| KR | 10-2007-0022059 A | 2/2007 |
| KR | 10-2011-0078783 A | 7/2011 |
| KR | 10-2013-0127984 A | 11/2013 |
| KR | 10-2014-0054156 A | 5/2014 |
| KR | 10-1482288 B1 | 1/2015 |
| KR | 10-2015-0120264 A | 10/2015 |
| KR | 10-2016-0100284 A | 8/2016 |
| KR | 10-1656454 B1 | 9/2016 |
| KR | 10-2017-0133432 A | 12/2017 |
| KR | 10-2018-0023016 A | 3/2018 |
| TW | 201213429 A | 4/2012 |
| TW | 201305590 A | 2/2013 |
| TW | 201312171 A | 3/2013 |
| TW | 201541113 A | 11/2015 |
| TW | 201640148 A | 11/2016 |
| WO | 2013-054804 A1 | 4/2013 |
| WO | 2013-168569 A | 11/2013 |
| WO | 2014-057949 A1 | 4/2014 |
| WO | 2014-109370 A1 | 7/2014 |
| WO | 2017-061493 A1 | 4/2017 |
| WO | 2017-141903 A1 | 8/2017 |
| WO | 2018-110949 A1 | 6/2018 |

OTHER PUBLICATIONS

Extended European Search Report dated Sep. 30, 2021, of the corresponding European Patent Application No. 20741655.3, 9 pages.

\* cited by examiner

[FIG. 1]
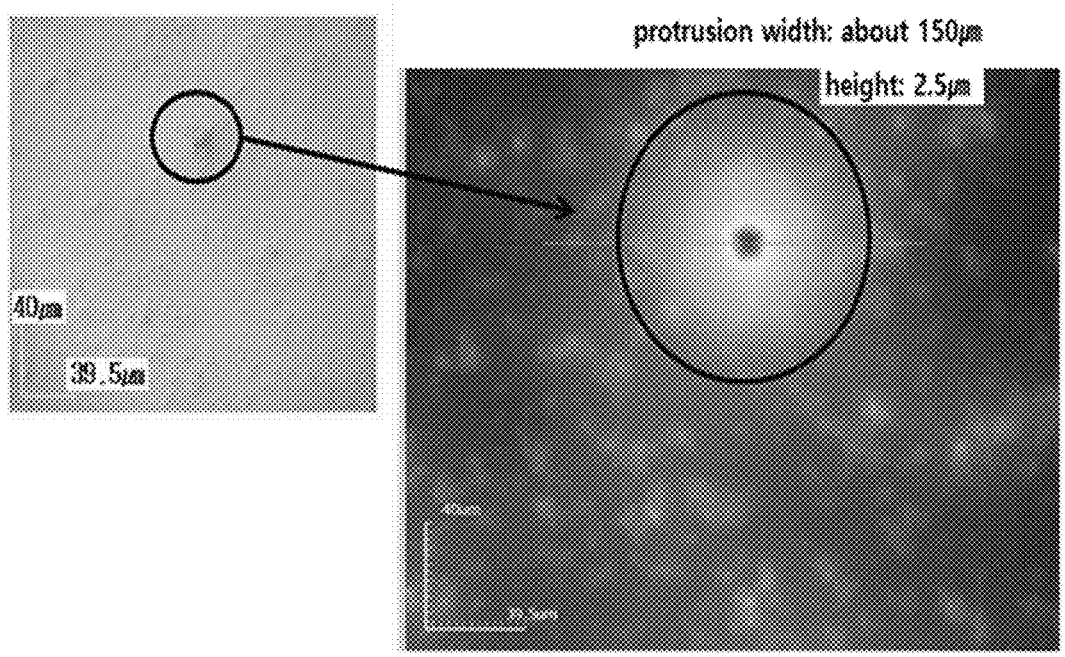

[FIG. 2]
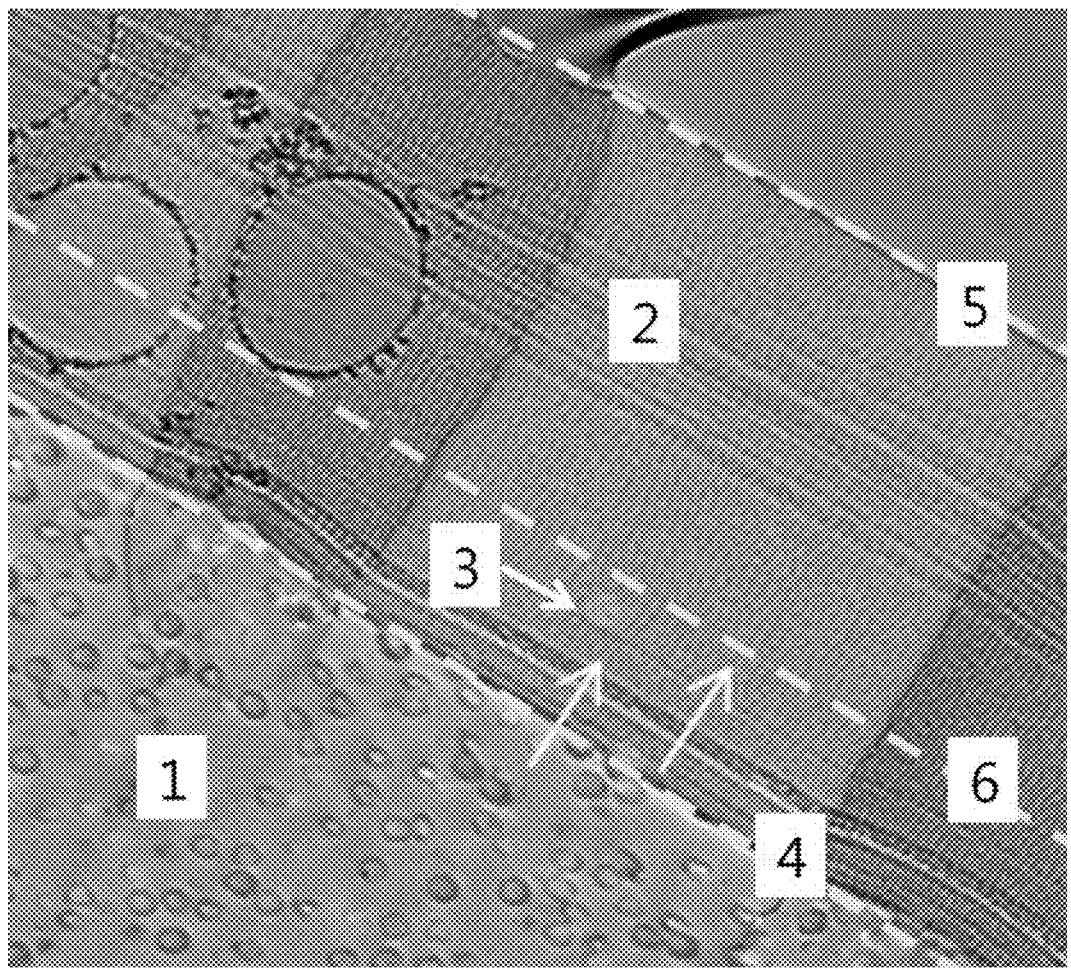

[FIG. 3]
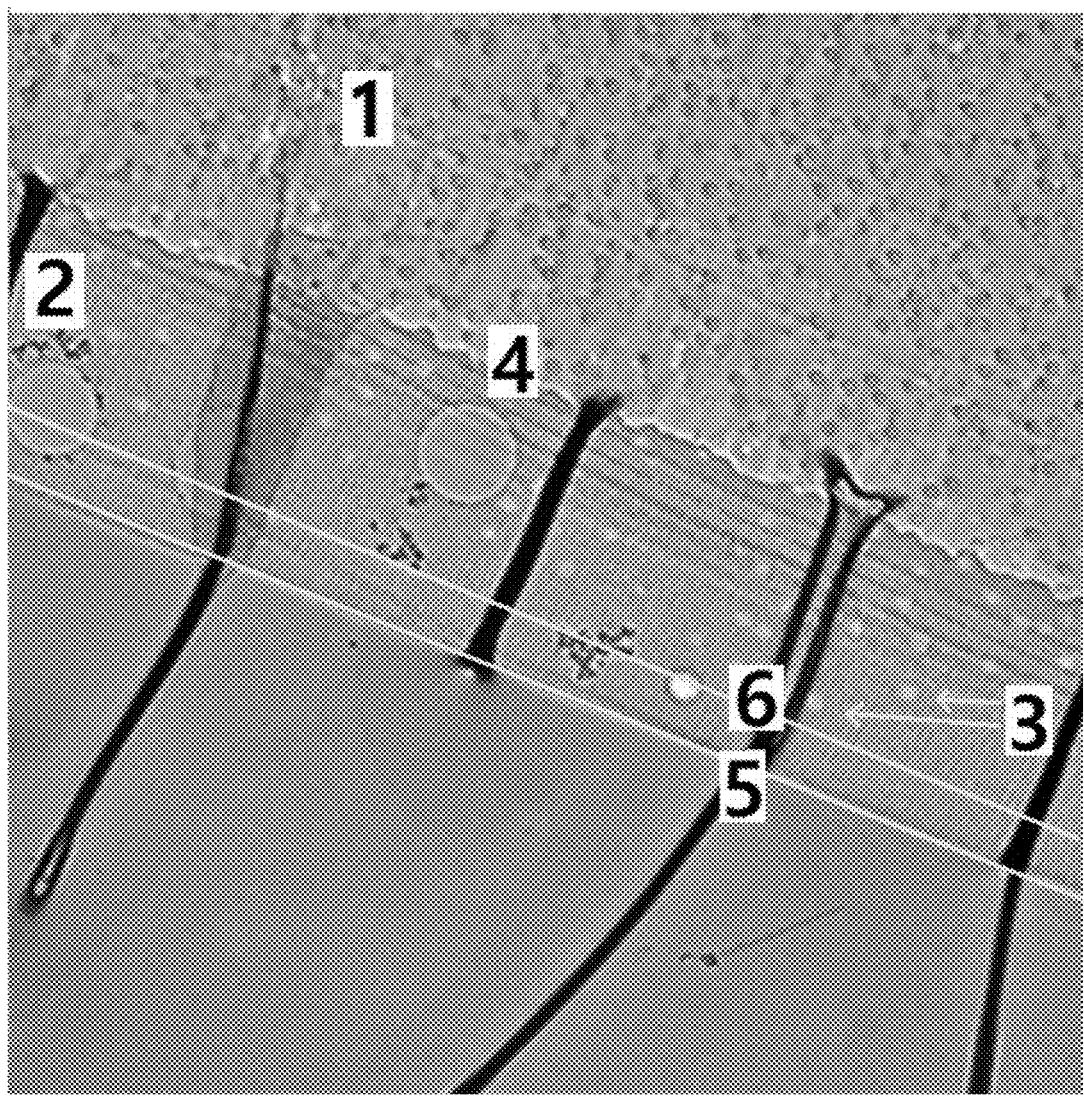

POLARIZING PLATE, AND DISPLAY DEVICE

CROSS-REFERENCE TO RELATED APPLICATION(S)

This application is a 35 U.S.C. 371 National Phase Entry Application from PCT/KR2020/000509, filed on Jan. 10, 2020, designating the United States, which claims priority to or the benefit of Korean Patent Application No. 10-2019-0004838 filed with the Korean Intellectual Property Office on Jan. 14, 2019, the disclosures of which are incorporated herein by reference in their entirety.

The present disclosure relates to a polarizing plate, and a display device.

TECHNICAL FIELD

Background of the Invention

In an image display device such as an organic light emitting display (OELD) or a liquid crystal display (LCD), it is required to prevent a decrease in contrast and a decrease in visibility due to reflection of an external light or reflection of an image. To this end, an optical laminated film such as an anti-reflection film is formed on the surface of the image display device in order to reduce reflection of an external light or reflection of an image by utilizing light scattering and optical interference.

For example, in a liquid crystal display device or the like, the optical laminated film including an antiglare layer has been mainly formed since before. This antiglare layer mainly includes a binder and fine particles contained in the binder, wherein these fine particles are usually formed with irregularities such that a part thereof is projected on the surface of the binder. That is, as the antiglare layer has surface irregularities due to the fine particles protruding on the surface of the binder, it is possible to suppress a decrease in the visibility of the image display device by controlling light scattering/light reflection and the like.

However, in the case of an optical film including an antiglare layer known before, in order to form irregularities on the surface, organic fine particles and inorganic nanoparticles were used, but inorganic nanoparticles have low dispersibility in a binder and a solvent which causes a problem in that aggregation occurs between inorganic nanoparticles.

In particular, the inorganic nanoparticles induce aggregation of organic fine particles while surrounding the surface of the organic fine particles. At this time, when the organic fine particles surrounded by such inorganic nanoparticles are excessively aggregated in a direction perpendicular to the surface of the antiglare layer, there is a problem that irregularity defects occur in which surface irregularities are too large or irregularities are often formed.

In addition, due to these irregularity defects, the optical properties of the antiglare layer are rather reduced, and thus the antiglare properties for controlling light scattering/light reflection and the like are not properly exhibited. And defects may occur in which the image distortion may occur at that area or the reflection of light is amplified more than the peripheral area to cause glittering, also known as sparking (glittering) phenomenon. Therefore, improvement thereon is needed.

BRIEF SUMMARY OF THE INVENTION

The present disclosure provides a polarizing plate having high durability against heat and water, realizing high contrast ratio and excellent image sharpness, and having mechanical properties such as high wear resistance and scratch resistance.

The present disclosure provides a liquid crystal panel and a display device including the above-mentioned polarizing plate, respectively.

In one aspect, there can be provided a polarizing plate including: a polarizer; an optical laminate formed on one side of the polarizer and containing a polymer substrate and an antiglare layer; and a thermoplastic resin layer formed on the other side of the polarizer and containing a (meth) acrylate resin, wherein the polymer substrate contains a polymer resin and rubber particles having a cross-sectional diameter of 10 to 500 nm dispersed in the polymer resin, wherein the antiglare layer contains a binder resin and organic fine particles or inorganic fine particles dispersed in the binder resin, and wherein a ratio where a fine protrusion having a diameter of 100 μm or more formed by aggregating the organic fine particles or inorganic fine particles exists on the outer surface of the antiglare layer is $50/m^2$ or less.

In another aspect, there is provided a display device including the above-mentioned polarizing plate.

DETAILED DESCRIPTION OF THE INVENTION

Hereinafter, the optical laminate, the polarizing plate, and the display device according to specific embodiments of the present disclosure will be described in more detail.

Terms such as first, second, and the like may be used to describe various components, and the terms are used only to discriminate one constituent element from another component.

Further, a (meth)acryl is meant to include both acryl and methacryl.

Further, the nano-inorganic fine particles having a hollow structure refer to particles in a form in which an empty space exists on the surface of and/or inside the nano-inorganic fine particles.

In addition, a (co)polymer is meant to include both a co-polymer and a homo-polymer.

According to one embodiment of the present disclosure, there can be provided a polarizing plate including: a polarizer; an optical laminate formed on one side of the polarizer and containing a polymer substrate and an antiglare layer; and a thermoplastic resin layer formed on the other side of the polarizer and containing a (meth)acrylate resin, wherein the polymer substrate contains a polymer resin and rubber particles having a cross-sectional diameter of 10 to 500 nm dispersed in the polymer resin, wherein the antiglare layer contains a binder resin and organic fine particles or inorganic fine particles dispersed in the binder resin, and wherein a ratio where a fine protrusion having a diameter of 100 μm or more formed by aggregating the organic fine particles or inorganic fine particles exists on the outer surface of the antiglare layer is $50/m^2$ or less.

As a ratio where a fine protrusion having a diameter of 100 μm or more formed by aggregating the organic fine particles or inorganic fine particles exists on the outer surface of the antiglare layer is $50/m^2$ or less, or 1 to $30/m^2$ or less, or substantially absent, the polarizing plate of the embodiment including the optical laminate may realize high contrast ratio and uniform and good image sharpness even while having a relatively low haze value.

The antiglare layer and/or the polarizing plate may have a transmittance of 90% or more, and a haze of 10% or less, or 8% or less under an A light source (for example, measuring instrument: HM-150, measurement standard: JIS K 7105).

More specifically, when the fine protrusions formed by aggregating the organic fine particles or the inorganic fine particles reach a size having a diameter of 100 μm or more, a sparkling (glittering) phenomenon that is visible to the naked eye may occur. As the ratio of the fine protrusions formed on the outer surface of the antiglare layer is relatively low, a sparking (glittering) phenomenon due to amplification of the reflected light can be prevented, and the sharpness of the image is uniform, thereby clearly realizing a high-resolution image.

In general, the higher the haze value, the greater the degree of diffusion of external light, thereby providing an excellent antiglare effect, but there is a problem that the contrast ratio is decreased due to an image distortion phenomenon caused by surface scattering and a whitening phenomenon caused by internal scattering. On the contrary, the polarizing plate of the embodiment includes the above-mentioned antiglare layer and thus can realize high contrast ratio and excellent image sharpness even while having a haze value that is not so high.

The diameter of the fine protrusions formed by aggregating the organic fine particles or the inorganic fine particles may be determined by the cross-sectional width in a direction parallel to the surface of the antiglare layer, and may be 100 μm or more, or 100 μm to 300 μm, or 110 μm to 250 μm, or 120 μm to 200 μm.

As described above, the ratio where the fine protrusions having a diameter of 100 μm or more formed by aggregating the organic fine particles or the inorganic fine particles exist on the outer surface of the antiglare layer may be 50/m$^2$ or less or 1 to 30/m$^2$. In addition, the ratio of the area where the fine protrusions are located in one surface of the antiglare layer defined by the following general formula 1 is 0.5 area % or less, 0.3 area % or less, or 0.01 to 0.5 area %, or 0.02 to 0.2 area %, or 0.05 to 1 area %.

The ratio of the area where the fine protrusions are located in one surface of the antiglare layer=
(the number of fine protrusions*the area of a circle having a diameter of 5 mm)/the area of one surface of the antiglare layer (mm$^2$)  [General Formula 1]

in the general formula 1, the "circle having a diameter of 5 mm" defined as an area where the fine protrusions are located.

The characteristics of the antiglare layer described above may be due to specifying the content of solids excluding the solvent in the coating composition for forming the antiglare layer, or the type of organic solvent used when forming the antiglare layer, or the like.

More specifically, the content of solids excluding the solvent in the coating composition for forming the antiglare layer may be 25 to 40% by weight or 30 to 35% by weight. As the content of solids of the coating composition for forming the antiglare layer is adjusted in the above-described range, the flow of organic fine particles or inorganic fine particles may be smoothly conducted during the formation of the antiglare layer, and thereby, the fine protrusions, which are aggregates thereof, may not be substantially generated.

Further, the coating composition for forming the antiglare layer may include a specific mixed solvent. The organic solvent may include an organic solvent of alcohols and non-alcohols, and more specifically, the organic solvent may be a mixed solvent including n-butyl acetate and 2-butanol.

Further, the organic solvent may include n-butyl acetate and 2-butanol in a weight ratio of 1:2 to 1:5.

By using the above-mentioned organic solvent, the flow of organic fine particles or inorganic fine particles may be smoothly conducted during the formation of the antiglare layer, and thereby, the fine protrusions, which are excessive aggregates thereof, may not be substantially generated.

Meanwhile, in the optical laminate, rubber particles having a cross-sectional diameter of 10 to 500 nm exist within 75% of the thickness, within 50% of the thickness, or within 30% of the thickness of the anti-glare layer from the interface between the polymer substrate and the antiglare layer, whereby the optical laminate can has relatively high scratch resistance and durability, while exhibiting excellent optical properties and antiglare properties such as low glossiness and reflectance, and an appropriate level of haze properties.

Rubber particles having a cross-sectional diameter of 10 to 500 nm contained in the polymer substrate may penetrate into the antiglare layer and expose to the outer surface of the antiglare layer during the manufacturing process of the optical laminate. The present inventors have adjusted so that the rubber particles are located within 75% or within 50% of the thickness, or within 30% of the thickness of the antiglare layer from the interface between the polymer substrate and the antiglare layer.

In this manner, the rubber particles are located from the interface between the polymer substrate and the antiglare layer only to a range within 75% or within 50% of the thickness, or within 30% of the thickness of the antiglare layer, and thus preventing that the rubber particles are exposed to the outer surface of the antiglare layer or are located on the upper surface of the antiglare layer, the phenomenon of lowering scratch resistance of the optical laminate, or increasing reflectance or haze properties.

More specifically, when coating a coating composition for forming the antiglare layer and applying a temperature exceeding 60° C. during heat treatment or drying, the rubber particles are raised to the anti-glare layer formed in the polymer substrate, and the rubber particles may be positioned from an interface between the polymer substrate and the antiglare layer to a range exceeding 75% of the thickness of the antiglare layer.

Thus, the coating composition for forming the antiglare layer may be coated and a temperature of 60° C. or less may be applied during heat treatment or drying.

On the other hand, as described above, in the manufacturing process of the optical laminate, a part of the rubber particles contained in the polymer substrate may move to the antiglare layer, whereby the rubber particles having a cross-sectional diameter of 10 to 500 nm existing within 50% of the thickness of the antiglare layer from the interface between the polymer substrate and the antiglare layer and the rubber particles having a cross-sectional diameter of 10 to 500 nm contained in the polymer substrate may be rubber particles of the same components.

The rubber particles can be natural rubber or synthetic rubber which is commonly known in the art. For example, the rubber particles may include one or more rubbers selected from the group consisting of styrene-based rubber, butadiene-based rubber, styrene-butadiene-based rubber and acrylic-based rubber.

The styrene-based monomer used in the production of the styrene-based, styrene-butadiene-based rubber may be an unsubstituted styrene monomer or a substituted styrene monomer.

The substituted styrene monomer may be styrene in which a benzene ring or vinyl group is substituted with a substituent containing an aliphatic hydrocarbon or a hetero atom. Examples thereof may be one or more selected from the group consisting of styrene, α-methylstyrene, 3-methylstyrene, 4-methylstyrene, 2,4-dimethylstyrene, 2,5-dimethylstyrene, 2-methyl-4-chlorosytrene, 2,4,6-trimethylstyrene, cis-β-methylstyrene, trans-β-methylstyrene, 4-methyl-α-methylstyrene, 4-fluoro-α-methylstyrene, 4-chloro-α-methylstyrene, 4-bromo-α-methylstyrene, 4-t-butylstyrene, 2-fluorostyrene, 3-fluorostyrene, 4-fluorostyrene, 2,4-difluorostyrene, 2,3,4,5,6-pentafluorostyrene, 2-chlorostyrene, 3-chlorostyrene, 4-chlorostyrene, 2,4-dichlorostyrene, 2,6-dichlorostyrene, octachlorostyrene, 2-bromostyrene, 3-bromostyrene, 4-bromostyrene, 2,4-dibromostyrene, α-bromostyrene and β-bromostyrene, but are not limited thereto. More preferably, styrene substituted with $C_{1-4}$ alkyl or halogen can be used.

The butadiene-based monomer used in the production of the butadiene-based, styrene-butadiene-based rubber may be one or more selected from the group consisting of 1,3-butadiene, isoprene, 2,3-dimethyl-1,3-butadiene, 2-ethyl-1,3-butadiene, 1,3-pentadiene and chloroprene. Most preferably, 1,3-butadiene can be used in terms of good copolymerizability.

The acrylic-based monomer used in the production of the acrylic-based rubber may be one or more selected from the group consisting of methacrylic acid esters, unsaturated carboxylic acids, acid anhydrides and esters containing hydroxy group.

Specific examples of the acrylate-based monomers include methacrylic acid esters including methyl methacrylate, ethyl methacrylate, propyl methacrylate, butyl methacrylate, hexyl methacrylate, 2-ethylhexyl methacrylate, and benzyl methacrylate; acrylic acid esters including methyl acrylate, ethyl acrylate, propyl acrylate, butyl acrylate, hexyl acrylate, 2-ethylhexyl acrylate, cyclohexyl methacrylate, phenyl methacrylate, and benzyl methacrylate; unsaturated carboxylic acids including acrylic acid and methacrylic acid; acid anhydrides including maleic anhydride; esters containing hydroxy group including 2-hydroxyethyl acrylate, 2-hydroxypropyl acrylate and monoglycerol acrylate; or mixtures thereof; or a compound for polymerizing the acrylic monomer in the presence of a polyfunctional monomer.

The rubber particles may be formed of a single layer of such particles having rubber elasticity, or may be a multilayer structure having at least one rubber elastic layer. Acrylic rubber particles with a multilayer structure include those whose core is particles having rubber elasticity as described above and whose periphery is covered with a hard alkyl methacrylate polymer, those whose core is a hard methacrylic acid alkyl ester polymer and whose periphery is covered with an acrylic polymer having rubber elasticity as described above, those in which the periphery of the hard core is covered with an acrylic polymer having rubber elasticity and the periphery thereof is covered with a hard alkyl methacrylate polymer, and the like. The average diameter of the rubber particles formed in an elastic layer is usually in the range of about 10 to 500 nm.

Meanwhile, the polymer substrate may have a thickness of 10 to 150 μm, 20 to 120 μm, or 30 to 100 μm. If the thickness of the polymer substrate is less than 10 μm, the flexibility is reduced and it may be difficult to control the process. In addition, when the polymer substrate is excessively thick, the transmittance of the polymer substrate is reduced, the optical characteristics can be reduced, and it is difficult to make an image display device including the same thinner.

The antiglare layer may have a thickness of 1 to 10 μm. If the thickness of the antiglare layer is too thin, the hardness of the film becomes low, or the scratch resistance is lowered, which makes the film unsuitable for use as the outermost film of an optical laminate. If the thickness of the antiglare layer is too thick, warpage may occur in the film, the bending properties are deteriorated, and the film may be easily broken, thereby making it difficult to run the film during the roll process.

Meanwhile, the ratio of the thickness of the antiglare layer to the thickness of the polymer substrate may be 0.008 to 0.8, or 0.01 to 0.5. If the ratio of the thickness of the antiglare layer to the thickness of the polymer substrate is too small, the antiglare layer does not sufficiently protect the surface of the substrate and thus it may be difficult to secure mechanical properties such as pencil hardness. Further, when the ratio of the thickness of the antiglare layer to the thickness of the polymer substrate is too large, the flexibility of the laminate is reduced and the crack resistance may be insufficient.

The polymer substrate may include 5 to 50 parts by weight of rubber particles having a cross-sectional diameter of 10 to 500 nm relative to 100 parts by weight of the binder resin.

If the content of the rubber particles in the polymer substrate is too small compared to the binder resin, there is a problem that it is not possible to absorb impact from an external force and thus, the film is broken, or when the film is bent to a certain curvature or less, it is broken.

If the content of the rubber particles in the polymer substrate is too high compared to the binder resin, the mechanical strength of the film is weakened, the film can be easily deformed and the crosslinking density of the binder resin is decreased, so that the solvent erosion during hard coating increases, and the hardness and scratch resistance of the film may be deteriorated, and further, due to the difference in refractive index between the rubber particles and the polymer substrate component, the transmittance is decreased and thus, optical properties may be reduced.

Specific components of the polymer substrate are not particularly limited, but in order to secure moisture resistance together with a predetermined light transmittance, the polymer resin may include one or more selected from the group consisting of a (meth)acrylate resin, a cellulose resin, a polyolefin resin, and a polyester resin.

In the optical laminate, the moisture permeation amount of the polymer substrate measured for 24 hours under the conditions of 40° C. and 100% humidity may be 150 g/m$^2$ or less, or 100 g/m$^2$ or less, or 75 g/m$^2$ or less, or 5 to 75 g/m$^2$.

More specifically, the polymer substrate may have a moisture permeation amount of 150 g/m$^2$ or less, 100 g/m$^2$ or less, or 75 g/m$^2$ or less, or 5 to 75 g/m$^2$, when the moisture permeation amount is measured for 24 hours under the conditions of 40° C. and 100% humidity (measurement equipment: Labthink Instruments Co., Ltd.'s Water Vapor Permeability Tester).

Meanwhile, the antiglare layer may include 1 to 10 parts by weight of the organic fine particles or the inorganic fine particles relative to 100 parts by weight of the binder resin.

If the content of the organic fine particles or the inorganic fine particles in the antiglare layer is too small compared to the binder, the scattering/reflection of external light is not properly controlled, and thus the antiglare property may be greatly reduced, and further, the stability of the particles at the time of drying is sharply reduced and protrusions of several hundred μm in size may be formed, thus making it difficult to secure optical properties. In addition, if the content of the rubber particles in the polymer substrate is too high relative to the binder resin, the refraction of the transmitted image light may be increased and the image sharpness of the optical film can be greatly reduced or many overlapped particles may be generated, so that fine protrusions increase, white turbidity occurs, or the black sharpness of the film decreases.

The binder resin contained in the antiglare layer may include a photocurable resin. The photocurable resin means a (co)polymer of a photopolymerizable compound that can cause a polymerization reaction when irradiated with light such as ultraviolet rays.

Specific examples of the photopolymerizable compound include a (co)polymer formed from a vinyl-based monomer or oligomer or a (meth)acrylate monomer or oligomer.

Examples of the photocurable resin include a polymer or copolymer formed from a reactive acrylate oligomer group consisting of urethane acrylate oligomer, epoxide acrylate oligomer, polyester acrylate, and polyether acrylate; and a group consisting of a polyfunctional acrylate monomer including dipentaerythritol hexaacrylate, dipentaerythritol pentaacrylate, pentaerythritol tetraacrylate, pentaerythritol triacrylate, trimethylolpropane triacrylate, glycerin propoxylate triacrylate, trimethylpropane ethoxylate triacrylate, trimethylpropyl triacrylate, 1,6-hexanediol diacrylate, tripropylene glycol diacrylate, and ethylene glycol diacrylate, or an epoxy resin including epoxy group, alicyclic epoxy group, glycidyl group, epoxy group, or epoxy group containing oxetane group, or the like.

The binder resin may further include a (co)polymer (hereinafter referred to as high molecular weight (co)polymer) having a weight average molecular weight of 10,000 g/mol or more together with the above-mentioned photocurable resin. The high molecular weight (co)polymer may include, for example, one or more polymers selected from the group consisting of a cellulose-based polymer, an acrylic-based polymer, a styrene-based polymer, an epoxide-based polymer, a nylon-based polymer, an urethane-based polymer and a polyolefin-based polymer.

The particle diameter of the organic or inorganic fine particles is not particularly limited.

The organic fine particles contained in the antiglare layer may be a micron (μm) scale, and the inorganic fine particles contained in the antiglare layer may be a nano (nm) scale. In the present disclosure, a micron (μm) scale refers to having a particle size or a particle diameter of less than 1 mm, that is, less than 1000 μm, a nano (nm) scale refers to having a particle size or a particle diameter of less than 1 μm, that is, less than 1000 nm, and a sub-micron (sub-μm) scale refers to having a particle size or a particle diameter of a micron scale or nano scale.

More specifically, the organic fine particles may have a cross-sectional diameter of 1 to 50 μm, or 1 to 10 μm. Further, the inorganic fine particles may have a cross-sectional diameter of 1 nm to 500 nm, or 1 nm to 300 nm.

Specific examples of the organic or inorganic fine particles contained in the hard coating layer are not limited, but for example, the organic or inorganic fine particles may be organic fine particles composed of acrylic-based resin, styrene-based resin, epoxide resin and nylon resin, or inorganic fine particles composed of silicon oxide, titanium dioxide, indium oxide, tin oxide, zirconium oxide, and zinc oxide.

Meanwhile, the optical laminate of the embodiment is formed on one surface of the antiglare layer, and it may further include a low refractive index layer having a refractive index of 1.20 to 1.60 in the wavelength region of 380 nm to 780 nm.

The low refractive index layer having a refractive index of 1.20 to 1.60 in the wavelength region of 380 nm to 780 nm may include a binder resin and organic fine particles or inorganic fine particles dispersed in the binder resin. Optionally, it may further include a fluorine-containing compound having a photoreactive functional group and/or a silicon-based compound having a photoreactive functional group.

The binder resin contains a (co)polymer containing a polyfunctional (meth)acrylate repeating unit, and such repeating unit may be derived, for example, from a polyfunctional (meth)acrylate compound such as trimethylolpropane triacrylate (TMPTA), trimethylolpropaneethoxy triacrylate (TMPEOTA), glycerin propoxylated triacrylate (GPTA), pentaerythritol tetraacrylate (PETA), or dipentaerythritol hexaacrylate (DPHA).

The photoreactive functional group contained in the fluorine-containing compound or silicon-based compound may include one or more functional groups selected from the group consisting of (meth)acrylate group, epoxide group, vinyl group, and thiol group.

The fluorine-containing compound containing the photoreactive functional group may be one or more compounds selected from the group consisting of i) an aliphatic compound or an aliphatic cyclic compound in which at least one photoreactive functional group is substituted and at least one fluorine is substituted for at least one carbon; ii) a heteroaliphatic compound or heteroaliphatic cyclic compound in which at least one photoreactive functional group is substituted, at least one hydrogen is substituted with fluorine and at least one carbon is substituted with silicon; iii) a polydialkylsiloxane-based polymer in which at least one photoreactive functional group is substituted and at least one fluorine is substituted for at least one silicon; and iv) a polyether compound in which at least one photoreactive functional group is substituted and at least one hydrogen is substituted with fluorine.

The low refractive index layer may include hollow inorganic nanoparticles, solid inorganic nanoparticles, and/or porous inorganic nanoparticles.

The hollow inorganic nanoparticles refer to particles having a maximum diameter of less than 200 nm and having a void space on the surface and/or inside thereof. The hollow inorganic nanoparticles may include one or more selected from the group consisting of inorganic fine particles having a number average particle diameter of 1 to 200 nm, or 10 to 100 nm. Further, the hollow inorganic nanoparticles may have a density of 1.50 $g/cm^3$ to 3.50 $g/cm^3$.

The hollow inorganic nanoparticles may contain one or more reactive functional groups selected from the group consisting of a (meth)acrylate group, an epoxide group, a vinyl group, and a thiol group on the surface. By containing the above-mentioned reactive functional group on the surface of the hollow inorganic nanoparticles, it may have a higher degree of crosslinking.

The solid inorganic nanoparticles may include one or more selected from the group consisting of solid inorganic fine particles having a number average particle diameter of 0.5 to 100 nm.

The porous inorganic nanoparticles may include one or more selected from the group consisting of inorganic fine particles having a number average particle diameter of 0.5 to 100 nm.

The low refractive index layer may include 10 to 400 parts by weight of the inorganic nanoparticles; and 20 to 300 parts by weight of a fluorine-containing compound and/or a silicon-based compound including the photoreactive functional group relative to 100 parts by weight of the (co) polymer.

Meanwhile, the polarizing plate according to another embodiment may include the optical laminate as a polarizer protective film.

More specifically, the polarizing plate includes a polarizer, an optical laminate formed on one side of the polarizer and containing a polymer substrate and an antiglare layer, and a thermoplastic resin layer formed on the other side of the polarizer and containing a (meth)acrylate resin.

In particular, previously known polarizing plates have a structure in which a triacetyl cellulose (TAC) film, etc. are disposed on both sides around the polarizer, whereas the polarizing plate of the embodiment has a structure in which the optical laminate having the above-described properties is disposed on one side, and the thermoplastic resin layer containing a (meth)acrylate resin is disposed on the other side, and therefore, a more robust structure can be realized even by a thinner thickness compared to other polarizer structures previously known in the art and it may have a characteristic that the durable structure or physical properties do not significantly change due to external heat.

The thickness of the thermoplastic resin layer is not particularly limited, but it may have a thickness of 10 µm to 80 µm, or 20 µm to 60 µm, or 30 µm to 50 µm in consideration of the structure and physical properties of the polarizing plate.

Meanwhile, the thickness of the thermoplastic resin layer relative to the thickness of the polymer substrate contained in the optical laminate is not limited, but if the thickness of the thermoplastic resin layer relative to the thickness of the polymer substrate does not have an appropriate range compared to the thickness of the polymer substrate, warpage can occur in the polarizing plate, the flexibility is reduced and it may be difficult to control the process. Accordingly, in the polarizing plate of the embodiment, the ratio of the thickness of the thermoplastic resin layer to the thickness of the polymer substrate included in the optical laminate may be 0.3 to 2.0, or 0.4 to 1.2, or 0.5 to 0.9.

Meanwhile, the thermoplastic resin layer may further include rubber particles for improving mechanical strength in addition to the (meth)acrylate-based resin.

Specific examples of the (meth)acrylate-based resin contained in the thermoplastic resin layer are not limited, and may include (meth)acrylate (co)polymer, (meth)acrylate ester (co)polymer, polymethyl methacrylate, and the like.

The (meth)acrylate-based resin contained in the thermoplastic resin layer may have a glass transition temperature of 130° C. or less, or 125° C. or less, or may have a glass transition temperature of 100° C. to 125° C.

The thermoplastic resin layer may be coupled via an adhesive layer to the other surface side of the polarizer. The adhesive layer may be formed, for example, by coating an adhesive composition on one surface of the polarizer, and curing the composition by drying, heating or irradiating electromagnetic waves. A specific kind that can be used as the adhesive of the adhesive layer is not particularly limited as long as it is any one which may be cured to express desired adhesive properties. For example, the adhesive may be any of a polyvinyl alcohol-based adhesive; an acrylic adhesive; a vinyl acetate-based adhesive; a urethane-based adhesive; a polyester-based adhesive; a polyolefin-based adhesive; a polyvinyl alkylether-based adhesive; a rubber-based adhesive; a chlorovinyl-vinylacetate-based adhesive; a styrene-butadiene-styrene (SBS) adhesive; a hydrogenated styrene-butadiene-styrene (SEBS)-based adhesive; an ethylene-based adhesive; and an acrylic acid ester-based adhesive, which are used alone or in combination of at least two thereof. The adhesive layer may be formed, for example, by curing a water-based, solvent-based, or non-solvent-based adhesive composition. The adhesive layer may also include a thermocurable, room temperature curable, moisture curable or photocurable adhesive composition in a cured state. As the adhesive layers, an adhesive layer including a water-based polyvinyl alcohol-based adhesive composition, a non-solvent acryl-based adhesive composition, and a non-solvent vinyl acetate-based adhesive composition in a cured state can be used.

The polarizing plate of the embodiment includes a polarizer.

As the polarizer, a polarizer well known in the art, for example, a film composed of polyvinyl alcohol (PVA) containing iodine or dichroic dyes may be used. In this case, the polarizer may be manufactured by dying iodine or dichromatic dyes on the polyvinyl alcohol film and stretching the film, but the manufacturing method is not particularly limited.

Meanwhile, when the polarizer is a polyvinyl alcohol film, the polyvinyl alcohol film may be used without particular limitation as long as it contains a polyvinyl alcohol resin or a derivative thereof. At this time, examples of the derivative of the polyvinyl alcohol resin include, but are not limited to, polyvinyl formal resin, polyvinyl acetal resin, and the like. Alternatively, the polyvinyl alcohol film may be a commercially available polyvinyl alcohol film generally used for the production of polarizers in the art, for example, P30, PE30 or PE60 manufactured by Kuraray, M3000, or M6000 manufactured by Nippon Synthetic Chemical Industry Co., Ltd., or the like.

Meanwhile, the polyvinyl alcohol may have a degree of polymerization of 1,000 to 10,000, or 1,500 to 5,000, without being limited thereto. When the degree of polymerization satisfies this range, molecules may move freely and may be smoothly combined with iodine, a dichroic dye, or the like. Further, the polarizer may have a thickness of 40 µm or less, 30 µm or less, 20 µm or less, 1 to 20 µm, or 1 µm to 10 µm. In this case, devices, such as a polarizing plate and an image display device containing the polarizer can be made thinner and lighter.

The polarizing plate may further include an adhesive layer which is located between the polarizer and the polymer substrate of the optical laminate and which has a thickness of 0.1 µm to 5 µm.

In the adhesive layer, various polarizing plate adhesives used in the art, for example, polyvinyl alcohol-based adhesives, polyurethane-based adhesives, acrylic-based adhesives, cationic-based or radical-based adhesives and the like can be used as the adhesive without limitation.

According to the other embodiment of the present disclosure, there can be provided a display device including the above-described optical laminate or polarizing plate.

Specific examples of the display device are not limited, and may be, for example, a device such as a liquid crystal display, a plasma display device, or an organic light emitting diode device.

As one example, the display device may be a liquid crystal display device including a pair of polarizing plates facing each other; a thin film transistor, a color filter, and a liquid crystal cell sequentially stacked between the pair of polarizing plates; and a back light unit.

In the display device, the optical laminate or the polarizing plate may be provided on the outermost surface of a display panel facing an observer or on the outermost surface thereof facing a backlight.

In another example, the display device may include a display panel; and a polarizing plate disposed on at least one surface of the display panel.

The display device may be a liquid crystal display device including a liquid crystal panel and an optical laminate provided on both surfaces of the liquid crystal panel, wherein at least one of the polarizing plates may be a polarizing plate including a polarizer according to one embodiment of the present disclosure.

At this time, the type of liquid crystal panel included in the liquid crystal display device is not particularly limited, but for example, a known panel such as a passive matrix-type panel such as a twisted nematic (TN), super twisted nematic (STN), ferroelectric (F) or polymer dispersed (PD) panel, an active matrix-type panel such as a two or three terminal panel, an in-plane switching (IPS) panel or a vertical alignment (VA) panel may be used.

ADVANTAGEOUS EFFECTS

According to the present disclosure, a polarizing plate realizing high contrast ratio and excellent image sharpness, and having mechanical properties such as high wear resistance and scratch resistance, and a liquid crystal panel and a display device including the polarizing plate can be provided.

BRIEF DESCRIPTION OF THE DRAWINGS

FIG. 1 is a photograph taken with a laser microscope (Optical Profiler) together with its enlarged version, confirming fine protrusions of 100 μm or more in the optical laminate of Preparation Example 1.

FIG. 2 shows a cross-sectional TEM photograph of the optical laminate of Preparation Example 1.

FIG. 3 shows a cross-sectional TEM photograph of the optical laminate of Comparative Example 2.

DETAILED DESCRIPTION OF THE EMBODIMENTS

Hereinafter, embodiments of the present disclosure will be described in more detail by way of examples. However, these examples are provided for illustrative purposes only and are not intended to limit the scope of the present disclosure.

Preparation Examples 1 to 3 and Comparative Examples 1 to 3: Preparation of Optical Laminate (1) Preparation of Coating Composition for Forming Antiglare Layer]

The components shown in Table 1 below were mixed to prepare a coating composition for forming an antiglare layer.
(2) Preparation of Optical Laminate Each of the above-prepared coating solutions for forming the antiglare was coated onto the polymer substrate described in Table 1 below by #12 mayer bar, and then dried at a temperature of 40° C. for 2 minutes, followed by UV curing to form an antiglare layer (coating thickness of 4 μm). When UV curing, the UV lamp used a H bulb, the curing reaction was carried out under a nitrogen atmosphere, and the amount of UV light irradiated during curing is 150 mJ/cm$^2$.

TABLE 1

|  |  | Preparation Example 1 | Preparation Example 2 | Preparation Example 3 | Comparative Preparation Example 1 | Comparative Preparation Example 2 | Comparative Preparation Example 3 |
|---|---|---|---|---|---|---|---|
| Polymer substrate |  | Acrylic film(WOLF, supplied by Sumitomo, thickness: 60 μm, including acrylic rubber particles having an average particle diameter of 300 nm) | | | | | |
| Antiglare layer coating composition | TMPTA | 9.85 | 7.88 | 8.77 | 10.7 | 8.76 | 6.93 |
|  | PETA | 6.11 | 7.88 | 7.18 | 4.67 | 6.81 | 8.92 |
|  | UA-306T | 6.11 | 5.32 | 6.98 | 4.67 | 5.26 | 5.35 |
|  | G8161 | 6.9 | 7.88 | 5.98 | 8.76 | 7.79 | 7.93 |
|  | D1173 | 0.89 | 0.83 | 0.83 | 0.83 | 0.83 | 0.89 |
|  | I184 | 0.89 | 0.83 | 0.83 | 0.83 | 0.83 | 0.89 |
|  | Tego270 | 0.04 | 0.04 | 0.06 | 0.04 | 0.05 | 0.05 |
|  | BYK350 | 0.07 | 0.07 | 0.07 | 0.07 | 0.07 | 0.07 |
|  | Organic fine particle XX-103BQ | 0.97 | 1.16 | 1.32 | 1.15 | 1.31 | 1.53 |
|  | Inorganic fine particle MA-ST | 0.18 | 0.18 | 0.18 | 0.2 | 0.16 | 0.21 |
|  | EtOH |  |  |  | 41.84 | 9.73 | 0 |

TABLE 1-continued

|  | Preparation Example 1 | Preparation Example 2 | Preparation Example 3 | Comparative Preparation Example 1 | Comparative Preparation Example 2 | Comparative Preparation Example 3 |
|---|---|---|---|---|---|---|
| Polymer substrate | Acrylic film(WOLF, supplied by Sumitomo, thickness: 60 μm, including acrylic rubber particles having an average particle diameter of 300 nm) | | | | | |
| n-BA | 12.81 | 12.8 | 13.12 |  | 29.2 | 10.76 |
| 2-BuOH | 55.18 | 55.13 | 54.68 | 26.24 | 29.2 | 56.47 |
| Coating thickness (μm) | 4 | 4 | 4 | 4 | 4 | 4 |

TMPTA: trimethyloylpropyltriacrylate
PETA: pentaerythritol triacrylate
UA-306T: reaction product of toluene diisocyanate and pentaerythritol triacrylate as urethane acrylate (manufactured by Kyoeisha Chemical)
G8161: photocurable acrylate polymer (Mw ~200,000, manufactured by San Nopco)
IRG-184: initiator (Irgacure 184, Ciba)
Tego-270: leveling agent (Tego)
BYK350: leveling agent (BYK Chemie)
IPA: Isopropyl Alcohol
XX-103BQ (2.0 μm 1.515): Copolymerized particles of polystyrene and polymethyl methacrylate (manufactured by Sekisui Plastic)
XX-113BQ (2.0 μm 1.555): Copolymerized particles of polystyrene and polymethyl methacrylate (manufactured by Sekisui Plastic)
MA-ST (30% in MeOH): a dispersion in which nanosilica particles with a size of 10 to 15 nm are dispersed in methyl alcohol (product of Nissan Chemical)
EtOH: Ethanol
n-BA: n-butyl acetate
2-BuOH: 2-butanol Examples 1 to 3 and Comparative Examples 1 to 3: Preparation of Polarizing Plate A polyvinyl alcohol polarizer (thickness: 25 μm, manufacturer: LG Chem) was bonded to the polymer substrate side of the optical laminate prepared in each of Preparation Examples and Comparative Preparation Examples using a UV adhesive.

Then, a 40 μm thick acrylate resin film (LG Chem product, 40 μm polymethyl methacrylate substrate) was bonded to the other surface of the polyvinyl alcohol polarizer using a UV adhesive to prepare a polarizing plate.

Experimental Examples 1 to 5: Measurement of Physical Properties of Optical Laminate Experimental Example 1: Evaluation of Haze of Optical Laminate A 4 cm×4 cm specimen was prepared from the optical laminate obtained in each of Preparation Examples and Comparative Preparation Examples, and the transmittance was measured three times using a haze meter (HM-150, A light source, manufactured by Murakami Color Research Laboratory), and this was calculated as the total haze value. In the measurement, the light transmittance and the haze were simultaneously measured, and the light transmittance was measured according to JIS K 7361 standard and the haze was measured according to JIS K 7136 standard.

Experimental Example 2: Measurement of Image Sharpness (%)

The image sharpness of the optical laminates obtained in each of Preparation Examples and Comparative Examples was measured using ICM-1T manufactured by Suga Test Instrument Co., Ltd. The image sharpness was measured with slit widths of 0.125 mm, 0.5 mm, 1 mm and 2 mm and displayed as a total.

Experimental Example 3: Confirmation of the Ratio of Fine Particles that Aggregate on the Surface of the Antiglare Layer Samples cut into 50 cm*50 cm (width*length) from the optical laminates obtained in each of Preparation Examples and Comparative Examples were placed on black matt paper under LED illumination with a illuminance of 700 lux. Then, the film was arranged so that light was made incident at 70 degrees based on the surface of the sample film, and then observed from the side where the light was reflected to find fine protrusions having stronger sparkling than the peripheral part.

The parts confirmed by the fine protrusions were represented by circles of 5 mm in diameter, and the number of protrusions and the protrusion area ratios were calculated according to the following general formula.

At this time, the number of protrusions was calculated by the following general formula 2, the ratio of the area where fine protrusions having a diameter of 100 μm or more were formed on the outer surface of the antiglare layer of the aggregate of the organic fine particles or inorganic fine particles was defined by the following general formula 1.

The ratio of the area where the fine protrusions are located in one surface of the antiglare layer= (the number of fine protrusions*the area of a circle having a diameter of 5 mm)/the area of one side of the antiglare layer ($mm^2$)    [General Formula 1]

The "circle having a diameter of 5 mm" in the general formula 1 is defined as an area where the fine protrusions are located.

Number of protrusions (number/$m^2$): Number measured at 50 cm*50 cm*4    [General Formula 2]

Experimental Example 4: Measurement of Cross-Section

The sample was cut into a width of 0.5 cm to obtain a cross section, and a cross-sectional sample was prepared using the microtome technique. The surface and the cross section to be observed were coated with platinum (Pt), and then the thickness of the coating layer, the thickness of the erosion layer, and the position of the rubber particles were observed by TEM. If the erosion layer was not clearly visible, the surface of the cross-sectional sample was etched with microwaves, coated with platinum, and then observed to confirm the thickness of the erosion layer.

Experimental Example 5: Measurement of Scratch Resistance

Using a scratch-resistant measuring device (KPD-301, Kipae E & T), the surface of the optical laminates obtained in Preparation Examples and Comparative Preparation Examples were rubbed back and forth 10 times with a steel wool (#0000) under a load at a speed of 27 rpm within a section of 2.5 cm in width and 13 cm in length. The scratch resistance was evaluated by confirming the maximum load at which a scratch of 1 cm or more observed with the naked eye was 1 or less.

TABLE 2

Result of Experimental Example

| | Preparation Example 1 | Preparation Example 2 | Preparation Example 3 | Comparative Preparation Example 1 | Comparative Preparation Example 2 | Comparative Preparation Example 3 |
|---|---|---|---|---|---|---|
| Haze(%) | 2.1 | 2.1 | 2 | 2.0 | 2.1 | 2.3 |
| Image sharpness | 368 | 360 | 343 | 300 or less | 300 or less | 300 of less |
| Number of protrusions (ea/m2) | 3 | 16 | 38 | About 1000 | About 300 | About 100 |
| Ratio of area of protrusion (%) | <0.1 | <0.1 | <0.1 | ~2% | 0.5% | 0.2% |
| Maximum thickness at which rubber particles were observed | <25% | <25% | <50% | <25% | <90% | <50% |
| Scratch Resistance | 700 gf | 700 gf | 500 gf | 500 gf | 500 gf NG | 500 gf NG |

As shown in FIG. 2, it was confirmed that in the optical laminate of Preparation Example 1, the rubber particles having a cross-sectional diameter of 10 to 500 nm exist within 25% of the thickness of the antiglare layer from the interface between the polymer substrate and the antiglare layer. In contrast, as shown in FIG. 3, it was confirmed that in the optical laminate of Comparative Preparation Example 2, the rubber particle having a cross-sectional diameter of 10 to 500 nm exists within 90% of the thickness of the antiglare layer from the interface between the polymer substrate and the antiglare layer.

Further, as shown in Table 1, it was confirmed that the optical laminates of Preparation Examples have a haze and high image sharpness at the level that antiglare property can be realized while having a high scratch resistance, whereas the optical laminates of Comparative Preparation Examples exhibit low level of scratch resistance and a relatively low image sharpness.

Examples 4 and Comparative Examples 4 and 5: Preparation of Polarizing Plate

Example 4

(1) Preparation of Coating Liquid (C) for Forming Low Refractive Index Layer 100 g of trimethylolpropane triacrylate (TMPTA), 283 g of hollow silica nanoparticles (diameter range: about 42 nm to 66 nm, JSC Catalyst and Chemicals), 59 g of solid silica nanoparticles (diameter range: about 12 nm to 19 nm), 115 g of a first fluorine-containing compound (X-71-1203M, Shin-Etsu), 15.5 g of a second fluorine-containing compound (RS-537, DIC Corporation) and 10 g of an initiator (Irgacure 127, Ciba) were diluted in a MIBK (methyl isobutyl ketone) solvent so as to have a solid content of 3% by weight, thereby preparing a coating liquid for forming a low refractive index layer.

(2) Preparation of Polarizing Plate

A polarizing plate was prepared in the same manner as in Example 1, except that after forming the antiglare layer on the polymer substrate in Example 1, the coating solution (C) for forming the low refractive index layer was coated with a #4 mayer bar to have a thickness of about 110 to 120 nm and dried and cured (irradiated with ultraviolet rays of 252 mJ/cm$^2$) at 40° C. for 1 minute to form a low refractive index layer.

Comparative Example 4

A TAC (triacetyl cellulose) film (thickness: 60 μm) was bonded to one surface of a polyvinyl alcohol polarizer (thickness: 17 μm, manufacturer: LG Chem) using a UV adhesive agent, then the coating solution of Preparation Example 1 was coated onto the TAC film with a #12 mayer bar, and then dried at a temperature of 40° C. for 2 minutes, and UV-cured to form an antiglare layer (coating thickness of 4 μm). When UV curing, the UV lamp used a H bulb, the curing reaction was performed under a nitrogen atmosphere, and the amount of UV light irradiated during curing is 150 mJ/cm$^2$.

Then, a 40 μm thick acrylate resin film (LG Chem product: 40 μm polymethyl methacrylate substrate) was bonded to the other surface of the polyvinyl alcohol polarizer using a UV adhesive to prepare a polarizing plate.

Comparative Example 5

A 60 μm thick MUV acrylate resin film (LG Chem product, 60 μm thick acrylate film where a 100 nm thick primer layer was formed on one side) was bonded to one surface of a polyvinyl alcohol polarizer (thickness: 17 μm, manufacturer: LG Chem) using a UV adhesive agent, then the coating solution of Preparation Example 1 was coated onto the primer layer with a #12 mayer bar, and then dried at a temperature of 40° C. for 2 minutes, and UV-cured to form an antiglare layer (coating thickness of 4 μm). When UV curing, the UV lamp used a H bulb, the curing reaction was performed under a nitrogen atmosphere, and the amount of UV light irradiated during curing is 150 mJ/cm².

Then, a 40 μm thick acrylate resin film was bonded to the other surface of the polyvinyl alcohol polarizer using a UV adhesive to prepare a polarizing plate.

Experimental Example 6: Evaluation of Thermal Shock

The polarizing plate prepared in Example 4 and Comparative Examples 4 and 5 was bonded to one surface of a glass for TV (12 cm wide, 12 cm long, and 0.7 mm thick) to prepare a sample for evaluating thermal shock and water resistance. At this time, the polarizing plate was cut so that the MD direction of a polarizer was parallel to one side of the square.

Then, for the prepared polarizing plate and a sample for evaluation to which the polarizing plate was bonded, the thermal shock test and water resistance were conducted under the following conditions and the following items were measured and confirmed.

1) Measuring Conditions of Thermal Shock Test:

The polarizing plate and the sample for evaluation were placed upright on a thermal shock chamber. The process in which the temperature was raised from room temperature to 80° C. and left for 30 minutes, after which the temperature was lowered to −30° C. and left for 30 minutes, and then the temperature was controlled to room temperature was defined as 1 cycle, and a total of 100 cycles were repeated.

2) Vertex Detachment (Mm), 10×10/Film

The four vertices of the polarizing plate sample were observed, and the detachment between the coating layer and the polarizer, the peeling between the polarizer and the protective film, and the peeling and bending between the hard coating and the cohesive layer were observed. When the detachment occurred and bending appeared, the bending height from the floor in a state where the sample placed flat on the floor was measured to calculate the average height.

3) Water Resistance Test

Each cut specimen was attached to a glass substrate (a soda lime glass), thereby forming a sample. Subsequently, the formed sample was put into water at a temperature of 60° C., kept for 24 hours, and then taken out to observe whether air bubbles or peeling were generated. The water resistance was evaluated according to the following criteria. The sample formed right before the measurement of the water resistance was left for 24 hours at room temperature, and evaluated. Evaluation conditions were as follows.

X: No air bubbles and peeling were generated at an interface between an coating layer and a substrate layer or at an interface between an adhesive layer and a cohesive layer.

Δ: Air bubbles and/or peeling were slightly generated at an interface between an coating layer and a substrate layer or at an interface between an adhesive layer and a cohesive layer.

○: Air bubbles and/or peeling were considerably generated at an interface between an coating layer and a substrate layer or at an interface between an adhesive layer and a cohesive layer.

TABLE 3

|  |  | Example 4 | Comparative Example 4 | Comparative Example 5 |
|---|---|---|---|---|
| Evaluation result of thermal shock | Generation of crack | X | ○ | ○ |
|  | Air bubbles and peeling | X | ○ | Δ |
|  | Vertex Detachment (mm), 10 × 10/film | 2 | 30 | 10 |
| Evaluation result of water resistance | Air bubbles and peeling | X | ○ | Δ |

As shown in Tale 3, it was confirmed that the polarizing plate of Example 4 can control a heat shrinkage deformation rate or the like between detail layers and the like even when a temperature of 60° C. or higher is applied during the manufacturing process and has a good bending balance and also has a high stability when exposed to water for a long time. Thus, it was confirmed that even if it is left in an external environment exposed to heat and water for a long time, it can prevent cracking of the polarizer, and also prevent a light leakage of the liquid crystal display.

On the contrary, it was confirmed that the polarizing plates of Comparative Examples 4 and 5 have poor thermal resistance and water resistance, as a result of the thermal shock evaluation and water resistance evaluation.

DESCRIPTION OF SYMBOLS

1: polymer substrate
2: antiglare layer
3: rubber particles
4: interface between polymer substrate and antiglare layer
5: surface of antiglare layer
6: maximum range where rubber particles exist from the interface between the polymer substrate and the antiglare layer

The invention claimed is:

1. A polarizing plate comprising:
a polarizer;
an optical laminate formed on one side of the polarizer and containing a polymer substrate and an antiglare layer; and
a thermoplastic resin layer formed on the other side of the polarizer and containing a (meth)acrylate resin,
wherein the polymer substrate contains a polymer resin and rubber particles having a cross-sectional diameter of 10 to 500 nm dispersed in the polymer resin,
wherein the antiglare layer contains a binder resin and organic fine particles or inorganic fine particles dispersed in the binder resin,
wherein fine protrusions having a diameter of at least 100 μm formed by aggregating the organic fine particles or inorganic fine particles are present on an outer surface of the antiglare layer and a ratio of the number of the fine protrusions on the outer surface of the antiglare layer is 50/m² or less, and
wherein the rubber particles having a cross-sectional diameter of 10 to 500 nm exist in the antiglare layer only within 75% of the thickness of the antiglare layer from an interface between the polymer substrate and the antiglare layer such that the rubber particles having a cross-sectional diameter of 10 to 500 nm are not exposed to an outer surface of the antiglare layer.

2. The polarizing plate of claim 1, wherein a diameter of the fine protrusions formed by aggregating the organic fine particles or the inorganic fine particles is 100 μm to 300 μm.

3. The polarizing plate of claim 1, wherein a ratio of the area of a region where the fine protrusions are located on the surface of the antiglare layer as defined by general formula 1 is 0.5 area % or less, Ratio of the area of a region where the fine protrusions are located on a surface of the antiglare layer=(the number of fine protrusions*the area of a circle having a diameter of 5 mm)/the area of the surface of the antiglare layer (mm$^2$)    [General Formula 1]

in the general formula 1, the "circle having a diameter of 5 mm" is defined as the region where the fine protrusions are located.

4. The polarizing plate of claim 1, wherein the rubber particles having a cross-sectional diameter of 10 to 500 nm exist in the antiglare layer only within 50% of the thickness of the antiglare layer from an interface between the polymer substrate and the antiglare layer such that the rubber particles having a cross-sectional diameter of 10 to 500 nm are not exposed to an outer surface of the antiglare layer.

5. The polarizing plate of claim 1, wherein the polymer resin includes at least one resin selected from a (meth) acrylate resin, a cellulose resin, a polyolefin resin, and a polyester resin.

6. The polarizing plate of claim 4, wherein
the rubber particles having a cross-sectional diameter of 10 to 500 nm contained in the polymer substrate are rubber particles of the same components.

7. The polarizing plate of claim 1, wherein the rubber particles include at least one rubber selected from styrene-based rubber, butadiene-based rubber, styrene-butadiene-based rubber and acrylic-based rubber.

8. The polarizing plate of claim 1, wherein the polymer substrate has a thickness of 10 to 150 μm, and the antiglare layer has a thickness of 1 to 10 μm.

9. The polarizing plate of claim 1, wherein a ratio of the thickness of the antiglare layer to the thickness of the polymer substrate is 0.008 to 0.8.

10. The polarizing plate of claim 1, wherein the thermoplastic resin layer has a thickness of 10 μm to 80 μm.

11. The polarizing plate of claim 1, wherein a ratio of the thickness of the thermoplastic resin layer to the thickness of the polymer substrate is 0.3 to 2.0.

12. The polarizing plate of claim 1, wherein the polymer substrate includes 5 to 50 parts by weight of the rubber particles having a cross-sectional diameter of 10 to 500 nm relative to 100 parts by weight of the binder resin.

13. The polarizing plate of claim 1, wherein the antiglare layer includes 1 to 10 parts by weight of the organic fine particles or the inorganic fine particles relative to 100 parts by weight of the binder resin.

14. The polarizing plate of claim 1, wherein a moisture permeation amount of the polymer substrate measured for 24 hours under the condition of 40° C. and 100% humidity is 150 g/m$^2$ or less.

15. A display device comprising the polarizing plate of claim 1.

16. The polarizing plate of claim 6, wherein the rubber particles include at least one rubber selected from styrene-based rubber, butadiene-based rubber, styrene-butadiene-based rubber and acrylic-based rubber.

17. The polarizing plate of claim 8, wherein the thermoplastic resin layer has a thickness of 10 μm to 80 μm.

18. The polarizing plate of claim 10, wherein a ratio of the thickness of the thermoplastic resin layer to the thickness of the polymer substrate is 0.3 to 2.0.

* * * * *